US010424795B2

(12) United States Patent
Cash et al.

(10) Patent No.: US 10,424,795 B2
(45) Date of Patent: Sep. 24, 2019

(54) GAS DIFFUSION SUBSTRATE

(71) Applicants: JOHNSON MATTHEY FUEL CELLS LIMITED, London (GB); TECHNICAL FIBRE PRODUCTS LIMITED, Kendal Cumbria (GB)

(72) Inventors: James Matthew Cash, Kendal Cumbria (GB); Michael Jeschke, Kendal Cumbria (GB); Victoria Jane Wright, Kendal Cumbria (GB); Jonathan David Brereton Sharman, Reading Berkshire (GB)

(73) Assignee: Technical Fibre Products Limited, Kendal, England (GB)

( * ) Notice: Subject to any disclaimer, the term of this patent is extended or adjusted under 35 U.S.C. 154(b) by 382 days.

(21) Appl. No.: 15/116,572

(22) PCT Filed: Feb. 4, 2015

(86) PCT No.: PCT/GB2015/050302
§ 371 (c)(1),
(2) Date: Aug. 4, 2016

(87) PCT Pub. No.: WO2015/118323
PCT Pub. Date: Aug. 13, 2015

(65) Prior Publication Data
US 2016/0351919 A1 Dec. 1, 2016

(30) Foreign Application Priority Data
Feb. 5, 2014 (GB) .................................. 1401952.5

(51) Int. Cl.
*H01M 8/0234* (2016.01)
*H01M 4/86* (2006.01)
(Continued)

(52) U.S. Cl.
CPC ....... *H01M 8/0234* (2013.01); *H01M 4/8605* (2013.01); *H01M 4/8807* (2013.01);
(Continued)

(58) Field of Classification Search
CPC ............. H01M 8/0241; H01M 8/0243; H01M 8/0245; H01M 8/0234; H01M 4/8605; H01M 4/8807; H01M 2008/1095
See application file for complete search history.

(56) References Cited

U.S. PATENT DOCUMENTS

| 5,998,057 A | 2/1999 | Denton et al. |
| 5,865,968 A | 12/1999 | Koschany et al. |

(Continued)

FOREIGN PATENT DOCUMENTS

| DE | 603 19 031 T2 | 3/2009 |
| EP | 0 875 524 B1 | 11/1998 |

(Continued)

OTHER PUBLICATIONS

International Search Report, dated May 4, 2015, from corresponding PCT application.
(Continued)

*Primary Examiner* — Stephen J Yanchuk
*Assistant Examiner* — Philip A. Stuckey
(74) *Attorney, Agent, or Firm* — BakerHostetler

(57) ABSTRACT

A porous gas diffusion substrate that includes: (a) a porous non-woven web comprising carbon fibers; and (b) a carbonaceous residue; wherein the carbonaceous residue is embedded within the porous non-woven web; (c) a fluorinated polymer; and (d) inert particles wherein at least some of the carbon fibers of the porous non-woven web have a coating comprising the fluorinated polymer and inert particles is disclosed.

13 Claims, 5 Drawing Sheets

(51) Int. Cl.
*H01M 4/88* (2006.01)
*H01M 8/0243* (2016.01)
*H01M 8/0245* (2016.01)
*H01M 8/1018* (2016.01)

(52) U.S. Cl.
CPC ....... *H01M 8/0243* (2013.01); *H01M 8/0245* (2013.01); *H01M 2008/1095* (2013.01)

(56) References Cited

U.S. PATENT DOCUMENTS

| | | |
|---|---|---|
| 8,133,306 B2 | 3/2012 | Quayle et al. |
| 2008/0268297 A1 | 10/2008 | Quayle et al. |
| 2012/0045710 A1 | 2/2012 | Jeschke et al. |
| 2012/0115063 A1 | 5/2012 | Sumioka et al. |
| 2014/0011118 A1 | 1/2014 | Lee et al. |

FOREIGN PATENT DOCUMENTS

| | | |
|---|---|---|
| EP | 1 369 528 A1 | 10/2003 |
| JP | H01-253163 A | 10/1989 |
| JP | H05-078182 A | 3/1993 |
| JP | 2006-222024 A | 8/2006 |
| JP | 2008-503043 A | 1/2008 |
| JP | 2012-517683 A | 8/2012 |
| JP | 2013-004214 A | 1/2013 |
| JP | 2014-011163 A | 1/2014 |
| WO | 2004/066417 A2 | 8/2004 |
| WO | 2005/020356 A1 | 3/2005 |
| WO | WO-2005-124902 | 12/2005 |
| WO | WO-2010-092370 | 8/2010 |

OTHER PUBLICATIONS

GB Search Report, dated Jul. 23, 2014, from corresponding GB application.

Cross-section (not to scale) along part of the length of a coated carbon fibre of the gas diffusion substrate of the present invention.

SEM image of Example 1

SEM image of Comparative Example 2.

Corrosion Current Density of Example 1, Comparative Example 1 and Comparative Example 2 at a high potential (1.2V)

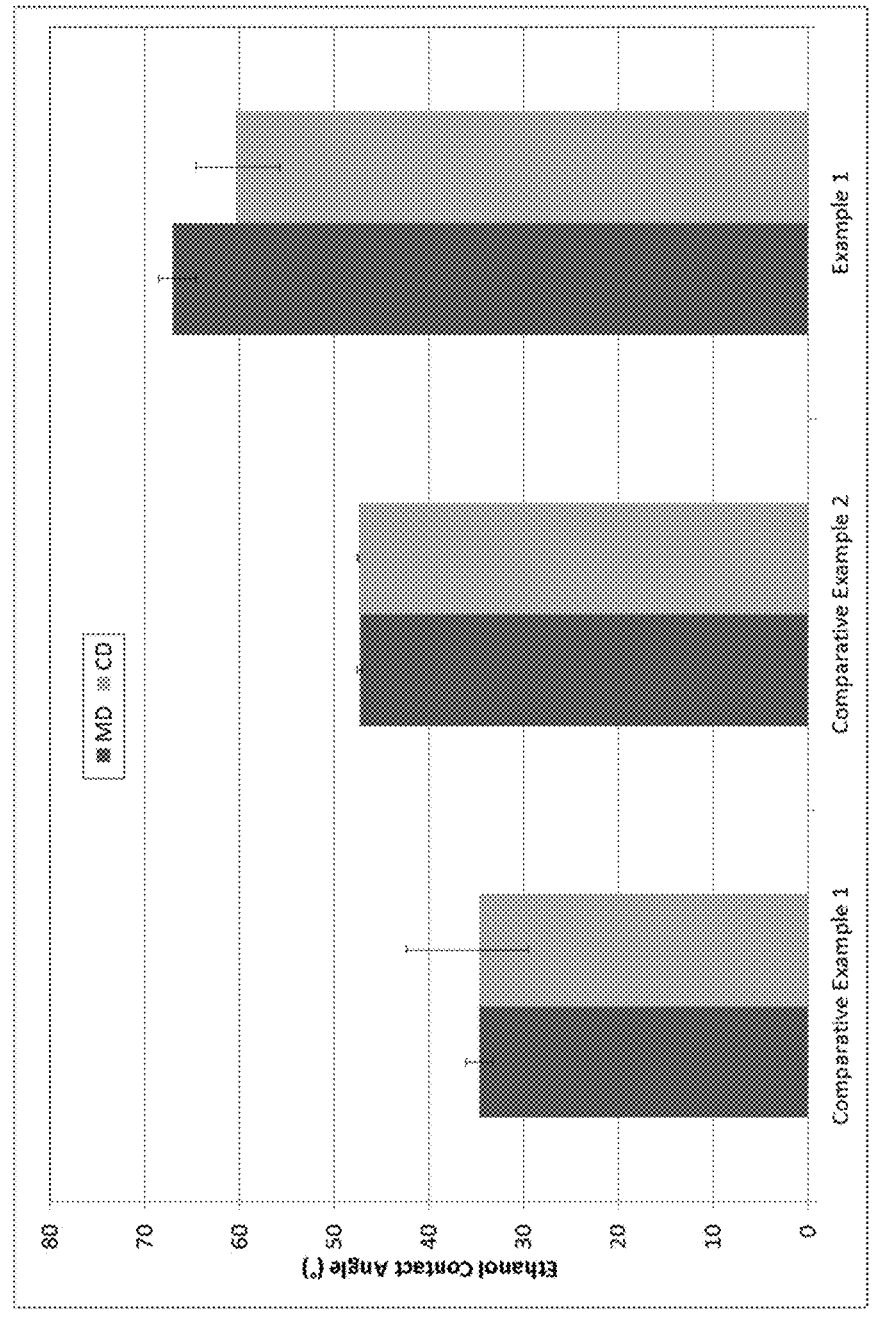

GAS DIFFUSION SUBSTRATE

FIELD OF THE INVENTION

The present invention relates to a gas diffusion substrate, particularly to a gas diffusion substrate for use in a fuel cell, such as a proton exchange membrane fuel cell. The invention further relates to a process for the manufacture of such gas diffusion substrates.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the hydrogen- or alcohol-fuelled proton exchange membrane fuel cell (PEMFC) the membrane is proton conducting, and protons, produced at the anode, are transported across the membrane to the cathode, where they combine with oxygen to form water.

The principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanoparticles (such as metal blacks or other unsupported particulate metal powders) or can be deposited as even higher surface area particles onto a conductive carbon substrate or other conductive material (a supported catalyst).

Conventionally, the MEA can be constructed by a number of methods outlined hereinafter:

(i) The electrocatalyst layer may be applied to the gas diffusion layer to form a gas diffusion electrode. A gas diffusion electrode is placed on each side of an ion-conducting membrane and laminated together to form the five-layer MEA;

(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs; removing products; providing electrical connections; and providing physical support.

Typically, the gas diffusion layers are formed from carbon fibre based gas diffusion substrates having a layer of particulate material (a microporous or base layer), such as carbon black and polytetrafluoroethylene (PTFE), on one face of the gas diffusion substrate, such that when formed into a MEA, the microporous layer contacts the electrocatalyst layer.

It is an essential requirement of a gas diffusion substrate that it is porous, electrically conductive and mechanically stable. The gas diffusion substrates most widely commercialised to date are made from carbonised polyacrylonitrile (PAN) fibres using a wet-laid or dry-laid process to produce a non-woven web of carbon fibres. The non-woven web is generally impregnated with an organic resin binder material (e.g. a phenolic resin) that is subsequently carbonised/graphitised when heat treated to a high temperature of in excess of 2000° C. Gas diffusion substrates manufactured using this high temperature process possess the required conductivity, stability and mechanical strength, but the process is extremely energy intensive and contributes significantly to the cost of these substrates.

Gas diffusion substrates similar to those described above, but using an intermediate-temperature process (around 1500° C. to 2000° C.) for the carbonisation of the organic binder material have been prepared; the process for preparing such substrates is less energy intensive than the higher temperature process and thus the cost of the substrates is less. Furthermore, such substrates are less rigid and can be prepared as a roll-good product.

Gas diffusion substrates that do not require a high temperature carbonisation or graphitisation step have also been proposed by incorporating a dispersion of a hydrophobic polymer and carbon black or graphitic particles into a non-woven carbon fibre network. Although these substrates are a lower cost option, the conductivity of such substrates may not be sufficient for some applications.

SUMMARY OF THE INVENTION

A problem with substrates prepared using an intermediate-temperature process is that the corrosion resistance of such substrates is lower than the corrosion resistance of substrates prepared using the high-temperature process.

The present inventors have surprisingly found that providing a coating of polymer and inert particles onto the individual fibres in the non-woven carbon fibre network of an intermediate-temperature substrate enables a gas diffusion substrate to be produced that has improved corrosion resistance and is still flexible (non-rigid) enabling a roll-good product to be produced.

The invention provides a porous gas diffusion substrate comprising:

(a) a porous non-woven web comprising carbon fibres; and (b) a carbonaceous residue;

wherein the carbonaceous residue is embedded within the porous non-woven web;

(c) a fluorinated polymer; and
(d) inert particles wherein at least some of the carbon fibres of the porous non-woven web have a coating comprising the fluorinated polymer and inert particles.

The invention further provides a process for the manufacture of the porous gas diffusion substrate of the invention, the process comprising the steps:
(i) providing a porous non-woven web comprising carbon fibres;
(ii) providing a dispersion comprising a carbonisable resin;
(iii) impregnating the porous non-woven web with the dispersion prepared in step (ii);
(iv) carrying out a curing step to cure the carbonisable resin at a temperature of from 100° C. to 300° C.;
(v) carrying out a heat treatment step to carbonise/graphitise the carbonisable resin at a temperature of from 900° C. to 3000° C. to provide a gas diffusion substrate precursor;
(vi) providing a dispersion comprising water, fluorinated polymer and inert particles;
(vii) treating the gas diffusion substrate precursor with the dispersion prepared in step (vi);
(viii) drying; and
(ix) heating at a temperature of up to 400° C. to provide the gas diffusion substrate.

The invention further provides: the use of the porous gas diffusion substrate in an electrochemical cell, for example a fuel cell; a gas diffusion layer comprising a gas diffusion substrate of the invention; an electrode comprising a gas diffusion substrate of the invention; and a membrane electrode assembly comprising a gas diffusion substrate of the invention.

BRIEF DESCRIPTION OF THE DRAWINGS

FIG. 5 is a graph showing the ethanol contact angle of an Example of the invention and two Comparative Examples.

DETAILED DESCRIPTION OF THE INVENTION

Figure 1:
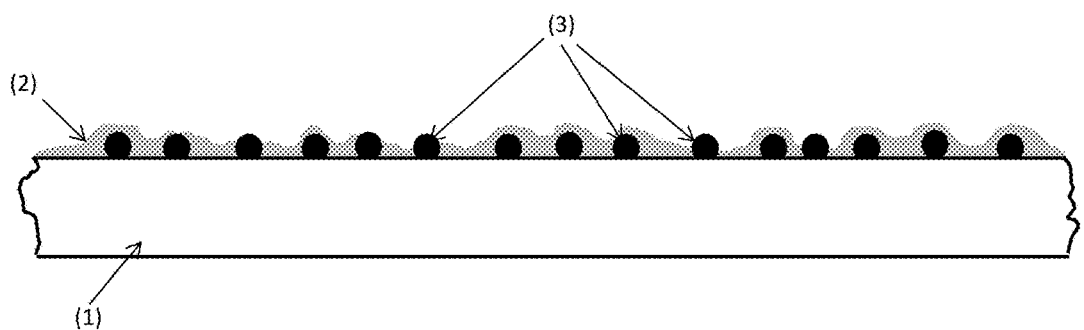
FIG. 1 is a cross-section along part of a length of a coated carbon fibre of the gas diffusion substrate of the present invention.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The porous gas diffusion substrate of the invention comprises: a porous non-woven web comprising carbon fibres; and a carbonaceous residue. At least some of the carbon fibres have a coating comprising a fluorinated polymer and inert particles.

Porous Non-Woven Web

The porous non-woven web comprises carbon fibres formed into a porous structure. The carbon fibres may be bound with a polymeric binder or thermally degradable binder which is removed from the non-woven fibre web during preparation of the substrate and is therefore not present in the final product.

The porous non-woven web (including any polymeric binder or thermally degradable binder) has a weight (grammage) of 20-250 gsm (g/m$^2$), suitably 50-200 gsm and preferably 60-120 gsm.

The carbon fibres used to form the porous non-woven web include those derived from polyacrylonitrile (PAN) fibres (such as SIGRAFIL® C grades from SGL Group, Panex grades (e.g. Panex 35) from Zoltek), pitch fibres (such as Dialead™ from Mitsubishi Plastics Inc., Thornel® Continuous Pitch-based carbon fibres and Thermalgraph® fibres both from Cytec Industries Inc.), rayon fibres or fibres derived from any other polymer precursor, activated carbon fibres (such as KOTHmex ACF from Taiwan Carbon Technology Co. Ltd and ACF 1603-15 and 1603-20 from Kynol Europa GmbH), carbon nanofibres, pitch based foam fibres or a mixture of one or more thereof. Suitably, the non-woven carbon fibre web comprises carbon fibres or carbon nanofibres (fibres with a diameter of less than 1000 nm) or mixtures thereof. Suitably, the carbon fibres are PAN fibres or pitch-based fibres; more suitably PAN fibres.

The carbon fibres suitably have a mean fibre diameter in the range of 0.1-20 µm, suitably in the range of 3-15 µm, suitably in the range of 5-10 µm and preferably in the range of 5-8 µm.

The carbon fibres suitably have a fibre length of 3 to 25 mm, suitably 6-18 mm and preferably 9-15 mm.

Individual carbon fibres may be sourced and a non-woven web prepared by a technique known to those skilled in the art. Such techniques include processes such as wet laid paper making methods, hydro-entanglement or dry deposition processes. Prior to impregnation with the carbonisable resin binder, the carbon fibres are held together with a polymeric binder or other thermally degradable binder. Examples of suitable binders include: polyvinyalcohol (PVA) fibres such as Mewlon SML from by Unitika Kasei Ltd and Fibribond VPB107-1 from Kuraray Co. Ltd.; polyester aqueous dispersions such as WD-30 Water-Dispersible Polymer (30% Solids) from Eastman Chemical Company; or a styrene/acrylic water based system such as Acronal S605, 500D or 205D from BASF. The polymeric binder is removed from the non-woven fibre web during preparation of the substrate and is therefore not present in the final product.

Alternatively, the non-woven web may be obtained as a pre-formed mat comprising carbon fibres (which may be bound with a polymeric binder or thermally degradable binder). Examples of such pre-formed mats include the Optimat® range of products from Technical Fibre Products Ltd or the AFN® Advanced Fiber Nonwovens range of products from Hollingsworth and Vose.

Carbonaceous Residue

The carbonaceous residue is the residue of a carbonisable resin after heat-treatment. The carbonisable resin is, for example, a phenolic resin binder of a pitch-based resin or other high-yield carbonisable resin such as polyimide. Examples of such resins which can be heat-treated to leave a carbonaceous residue include: SC-1008 from Borden Chemical Inc.; phenolic, novolac and resol resins from Dowell Trading Co. Ltd and Durez from Sumitomo Bakelite Co. Ltd. In the final gas diffusion substrate, the carbonisable resin has been carbonised and therefore the substrate comprises a carbonaceous residue of the carbonisable resin.

The carbonisable resin is added at a weight % of 10-80 wt %, suitably 30-80 wt % and preferably 40-70 wt % with respect to the total weight of the porous non-woven web (including any polymeric binder or thermally degradable binder present) and carbonisable resin.

Fluorinated Polymer

The fluorinated polymer is suitably selected from the group consisting of: fluorinated ethylene propylene (FEP); polyvinylfluoride (PVF), polyvinylidene fluoride (PVDF) polytetrafluoroethylene (PTFE); polychlorotrifluoroethylene (PCTFE); perfluoroalkoxy polymer (PFA); polyethylenetetrafluoroethylene (ETFE); polyethylenechlorotrifluoroethylene (ECTFE); perfluorinated elastomer [perfluoroelastomer] (FFPM/FFKM); fluorocarbon [chlorotrifluoroethylenevinylidene fluoride] (FPM/FKM); perfluoropolyether (PFPE); perfluorosulphonic acid (PFSA); and perfluoropolyoxetane. The fluorinated polymers are generally available as dispersions, typically aqueous dispersions, and often also comprise a surfactant. Examples of suitably fluorinated polymers include the Dyneon™ range (such as Dyneon™ THV, Dyneon™ FEP, Dyneon™ PFA) from 3M and the Fluon® PTFE range (such as AD208E) from AGC Chemicals Europe, Ltd.

Inert Particles

Any inert particle that does not interfere with any electrochemical reaction taking place when the gas diffusion substrate is used in any electrochemical cell may be used.

Examples of suitable particles include, but are not limited to: particulate graphite; particulate carbon (e.g. carbon black); metal oxide; refractory oxide; metal carbide. Particulate graphite or particulate carbon is particularly suitable.

The inert particles may exist as discrete single particles or as aggregates of smaller particles fused together. The inert particles suitably have a largest dimension of from 0.1 to 20 microns, suitably from 0.1 to 10 microns and preferably from 0.1 to 5 microns. For particles that are essentially spherical, the largest dimension is equivalent to the diameter.

Coating

The fluorinated polymer and inert particles form a coating on at least some of the carbon fibres in the porous non-woven fibres web.

Suitably, at least 50%, more suitably at least 75%, more suitably at least 90% and preferably at least 95% of the carbon fibres have a coating comprising the fluorinated polymer and inert particles.

The coating on the coated carbon fibres may be complete (i.e. the entire fibre is coated with the coating). Alternatively, the coating may be incomplete (i.e. there are parts of the carbon fibres which are not coated).

Suitably, the fluorinated polymer is present at a concentration of 1-20 weight %, suitably 5-15 wt %, preferably 7.5-12.5 wt %, with respect to the weight of the porous gas diffusion substrate precursor before adding the coating (but subsequent to carbonisation of the carbonisable resin).

Suitably, the inert particles are present at a concentration of 0.01-10 weight %, suitably 0.1-7.5 wt % and preferably 0.1-2 wt %, of the weight of the fluorinated polymer.

Suitably, some of the inert particles are not completely covered by the fluorinated polymer, but either stand proud of the surface of the fluorinated polymer or, by being partially embedded, cause the surface of the fluorinated polymer to undulate, to give a 'rough' texture.

FIG. 1 is a cross-section (not to scale) along part of the length of a coated carbon fibre of the gas diffusion substrate of the present invention. A carbon fibre (1) has a coating of fluorinated polymer (2) on its surface. Although the coating of fluorinated polymer (2) is shown to be continuous on one side of the carbon fibre (1), a carbon fibre (1) that is completely coated or where the coating is incomplete is within the scope of the invention. Inert particles (3) are embedded, or partially embedded, within the fluorinated polymer coating (2) on the carbon fibre (1). Although the inert particles (3) are shown as being essentially regularly spaced in the fluorinated polymer coating (2) along the carbon fibre (1), it will be understood by the skilled person that the distribution of the inert particles will be essentially random and there may be areas of the fluorinated polymer coating (2) where the density of inert particles is higher than in other areas.

Electrically Conductive Carbonaceous Particles

The gas diffusion substrate may optionally comprise electrically conductive carbonaceous particles which are embedded within the porous non-woven web with the carbonaceous residue. The electrically conductive carbonaceous particles include: (i) carbon blacks (e.g. Vulcan XC72R from Cabot); (ii) graphite (either synthetic or natural) (e.g. such as would be obtained from a dispersion from the Timrex® range from Imerys Graphite and Carbon or the Aquadag® range available from Henkel Corporation); (iii) a mixture of carbon black and graphite (e.g. such as would be obtained from a dispersion from the Timrex® range from Imerys Graphite and Carbon); (iv) nanofibres and nanotubes (e.g. Pyrograf III® Carbon Fiber from Pyrograf Products Inc. or VGCF-H from Showa Denko K.K.) or a mixture thereof; (v) nanographene platelets (sometimes referred to as graphene nanoplatelets), such as the N002, N006 and N008 series from Angstron Materials, Inc., xGnP® from XG Sciences, Inc., or US1059 from US Research Nanomaterials, Inc.). Any additional materials not listed here, but which are electrically conductive carbonaceous particles and suitable for use in a gas diffusion substrate are also within the scope of the present invention.

The porous gas diffusion substrate of the invention may comprise a single type of electrically conductive carbonaceous material or can comprise a mixture of two or more different types of electrically conductive carbonaceous material.

The electrically conductive carbonaceous particles are present at an amount of from 0.1% to 10 wt % of the carbonisable resin.

The gas diffusion substrate of the invention may be prepared by a process as hereinbefore described. A non-woven web is provided and impregnated with a dispersion comprising the carbonisable resin and, if present, the electrically conductive particles. The impregnation step is carried out by coating the non-woven web with the dispersion of carbonisable resin and, if present, electrically conductive particles. The impregnated non-woven web is heated at a temperature of from 100° C. to 300° C. to cure the carbonisable resin, followed by a heat treatment at 900° C. to 3000° C., suitably 900° C. to 2000° C. and preferably 1500° C. to 2000° C. to carbonise/graphitise the carbonisable resin, thus forming the carbonaceous residue. Optionally one or both of the heat treatment steps can be carried out under a compressive load. The gas diffusion substrate precursor comprising the non-woven web, carbonaceous residue and, if present, electrically conductive particles is then treated with a dispersion comprising water, fluorinated polymer and inert particles to provide the carbon fibres of the gas diffusion substrate with a coating of the fluorinated polymer and inert particles. Once treatment is complete, the substrate is dried and heated at a temperature of up to 400° C. (the exact heating temperature is dependent on the fluoropolymer used and will be easily determined by those skilled in the art). The dispersion of water, fluorintated polymer and inert particles is sufficiently fluid to penetrate through the entire porous substrate precursor. Surfactants may be present in the fluorinated polymer dispersion and additional surfactants may be used to aid penetration into the porous substrate precursor.

The porous gas diffusion substrate of the invention may be used as an electrode in any electrochemical device requiring a porous gas diffusion substrate. Accordingly, a further aspect of the invention provides a gas diffusion electrode comprising a porous gas diffusion substrate of the invention and an electrocatalyst layer present on one face of the porous gas diffusion substrate. For some applications, such as PEMFC, an additional carbonaceous layer commonly termed a microporous layer or base layer may also be applied before the deposition of the electrocatalyst layer to form, what is often referred to as, a gas diffusion layer (gas diffusion substrate+microporous layer). Accordingly a further aspect of the invention provides a gas diffusion layer comprising a porous gas diffusion substrate of the invention and a microporous layer applied to one face of the porous gas diffusion substrate. A still further aspect of the invention provides a gas diffusion electrode comprising a gas diffusion layer of the invention and an electrocatalyst layer present on the face of the gas diffusion layer having the microporous layer.

The porous gas diffusion substrate of the invention is also suitable for cells where the catalyst layer is deposited on the membrane or other separator, which electrically separates the anode and cathode electrodes.

The electrocatalyst layer comprises an electrocatalyst which may be a finely divided metal powder (metal black), or may be a supported catalyst wherein small metal particles are dispersed on electrically conducting particulate carbon supports. The electrocatalyst metal is suitably selected from
  (i) the platinum group metals (platinum, palladium, rhodium, ruthenium, iridium and osmium),
  (ii) gold or silver,
  (iii) a base metal,
or an alloy or mixture comprising one or more of these metals or their oxides. The preferred electrocatalyst metal is platinum, which may be alloyed with other precious metals, such as ruthenium, or base metals. If the electrocatalyst is a supported catalyst, the loading of metal particles on the carbon support material is suitably in the range 5-90 wt %, preferably 5-75 wt % of the weight of resulting electrocatalyst.

The electrocatalyst layer may suitably comprise other components, such as ion-conducting polymeric material, which is included to improve the ionic conductivity within the layer.

The present invention further provides a membrane electrode assembly comprising a non-woven gas diffusion substrate according to the invention. The membrane electrode assembly comprises a polymer electrolyte membrane interposed between two electrocatalyst layers. Gas diffusion substrates, at least one of which is a non-woven gas diffusion substrate according to the invention, are adjacent to the electrocatalyst layers.

The membrane may be any membrane suitable for use in a PEM fuel cell, for example the membrane may be based on a perfluorinated sulphonic acid material such as Nafion® (DuPont), Flemion® (Asahi Glass), Aciplex® (Asahi Kasei) and Aquivion™ (Solvay Plastics); these membranes may be used unmodified, or may be modified to improve the high temperature performance, for example by incorporating an additive. Alternatively, the membrane may be based on a sulphonated hydrocarbon membrane such as the Fumapem® P, E and K series of membranes available from FuMA-Tech GmbH. The membrane may be a composite membrane, containing the proton-conducting material and other materials that confer properties such as mechanical strength. For example, the membrane may comprise a proton-conducting membrane and a planar porous material such as expanded polytetrafluroethylene, as described in USRE37307, or a matrix of silica fibres, as described in EP0875524. Alternatively, the membrane may be based on polybenzimidazole doped with phosphoric acid and include membranes from developers such as FuMA-Tech GmbH which will operate in the range 120° C. to 180° C.

The MEA may further comprise components that seal and/or reinforce the edge regions of the MEA for example as described in WO2005/020356. The MEA is assembled by conventional methods known to those skilled in the art.

The MEA may be used in any electrochemical device requiring a MEA, for example a hydrogen-fuelled PEMFC or a direct methanol PEMFC.

The gas diffusion substrate or electrode of the invention may be used directly in a fuel cell, for example a phosphoric acid fuel cell wherein the electrolyte is liquid phosphoric acid in a supporting matrix, for example silicon carbide.

The gas diffusion substrates of the invention, when incorporated into a fuel cell, have improved corrosion resistance over state-of-the-art substrates prepared using an intermediate temperature carbonisation step.

In an operational fuel cell, the electrochemical potential of both the anode and cathode components may vary from 0V up to potentials as high as 1.5-1.6V (vs. RHE) under extreme operating conditions such as cell reversal or start-up/shutdown events. Whilst exposure to such high (oxidative) potentials may only be transient, the real-life fuel cell stack may be required to tolerate many thousands of such potential cycles in its lifetime. Additionally, when considering that the thermodynamic potential for carbon corrosion occurs at only 0.25V (25° C., vs. RHE) it is clear that the high potentials, particularly those in excess of 1.0V, prove particularly damaging to the carbonaceous components of the fuel cell. The most obvious consequence of carbon corrosion is complete loss of carbon from the system, by direct oxidation to $CO_2$. However, in the case of incomplete carbon oxidation, functional groups (such as carboxylic acid, hydroxyl groups etc.) may form on the carbon surface. Both events lead to a change in the hydrophobicity/hydrophilicity of the gas diffusion substrate and thus its water management and gas transportation capabilities can be affected. The improvement in carbon corrosion resistance can be shown using a standard electrochemical test as described in more detail hereinafter.

The invention will now be described further by reference to the following Example that is illustrative and not limiting of the invention.

Example 1

A non-woven web of 100 gsm containing PAN-based carbon fibres (Sigrafil® C30 fibres from SGL Group) and pitch fibres (Dialead™ K223HE from Mitsubishi Plastics Inc.) at a ratio of 2:1 was impregnated with phenolic resin (from Durez, Sumitomo Bakelite Co. Ltd) and carbon particles (from an aqueous dispersion of a carbon black available from Imerys Graphite and Carbon) (the electrically conductive carbonaceous particles). The phenolic resin made up 50% of the weight of the non-woven web and phenolic resin; the carbon black was present at 6.5 wt % relative to the phenolic resin. The impregnated non-woven web was heated to 150° C. to cure the resin and then heated to 1600° C. in an inert atmosphere to carbonise the resin to provide the carbonaceous residue, both heat treatment stages carried out under compression, to provide a substrate precursor.

(ii) A dispersion comprising water, fluorinated ethylene propylene (FEP) (Dyneon FEP 6300GZ) ((fluorinated polymer) and carbon black particles (from an aqueous dispersion of a carbon black available from Imerys Graphite and Carbon) (inert particles) was prepared using a high shear mixer. The carbon black particles were present at 0.5% of the mass of the FEP. The dispersion was placed in a tray and a sample of the impregnated non-woven web prepared above was submerged in the dispersion for 5 minutes, after which time the sample was removed and dried in ambient air for a short period. The sample was then inverted and submerged in the dispersion for a further 5 minutes, ambient air-dried for a short period and then dried in an oven for 30 minutes at 80° C. The temperature was ramped slowly to 385° C., held at this temperature in air for 15 minutes and then allowed to cool to provide the finished gas diffusion substrate having a FEP concentration of 10% with respect to the weight of the substrate precursor prior to coating of the fibres with FEP/carbon black (i.e. the substrate obtained after step (i)).

Comparative Example 1

A gas diffusion substrate comprising a non-woven web impregnated with electrically conductive carbonaceous particles and carbonaceous residue was prepared following a process as described in step (i) of Example 1.

Comparative Example 2

A gas diffusion substrate was prepared as described in Example 1, the difference being that the inert particles were excluded from step (ii).

Table 1 below summarises the components in Example 1 and the two Comparative Examples.

TABLE 1

| | Example 1 | Comparative Example 1 | Comparative Example 2 |
|---|---|---|---|
| Non-woven web | ✓ | ✓ | ✓ |
| Electrically conductive carbonaceous particles | ✓ | ✓ | ✓ |
| Carbonaceous residue | ✓ | ✓ | ✓ |
| Fluorinated polymer | ✓ | Not present | ✓ |
| Inert particles | ✓ | Not present | Not present |

Figure 2:
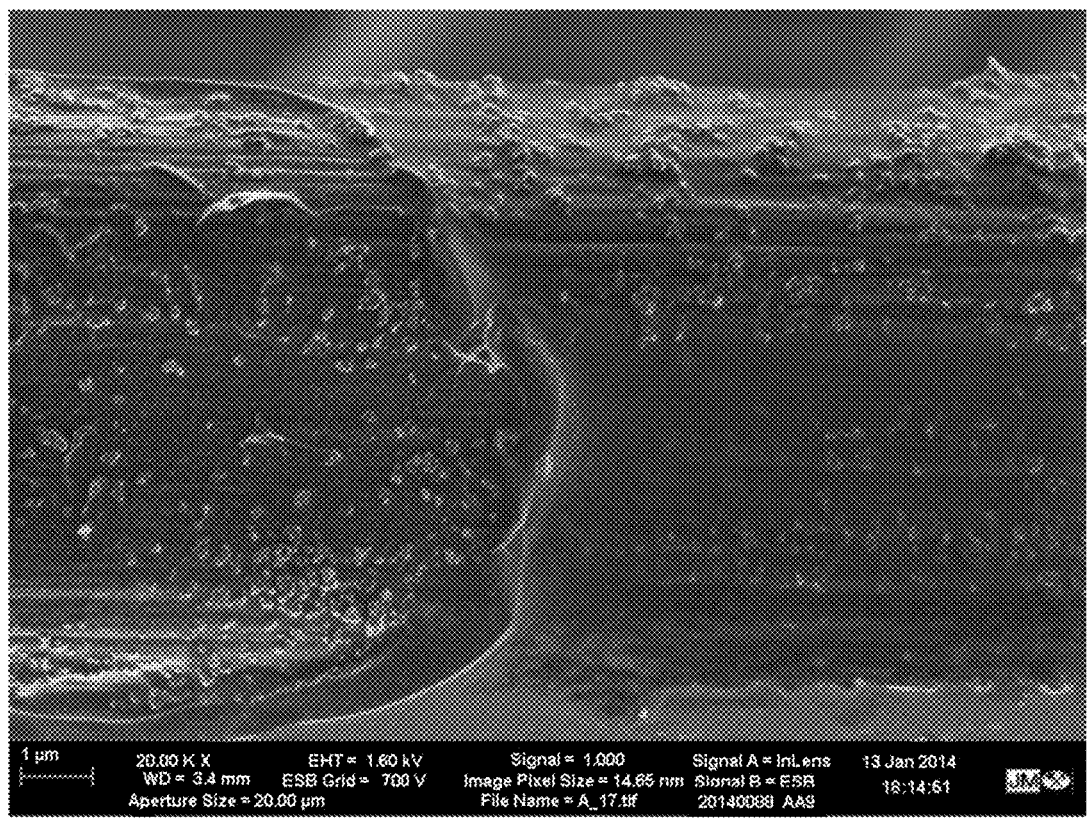
FIG. 2 is a scanning electron micrograph (SEM) image of an Example of the invention.
Figure 3:
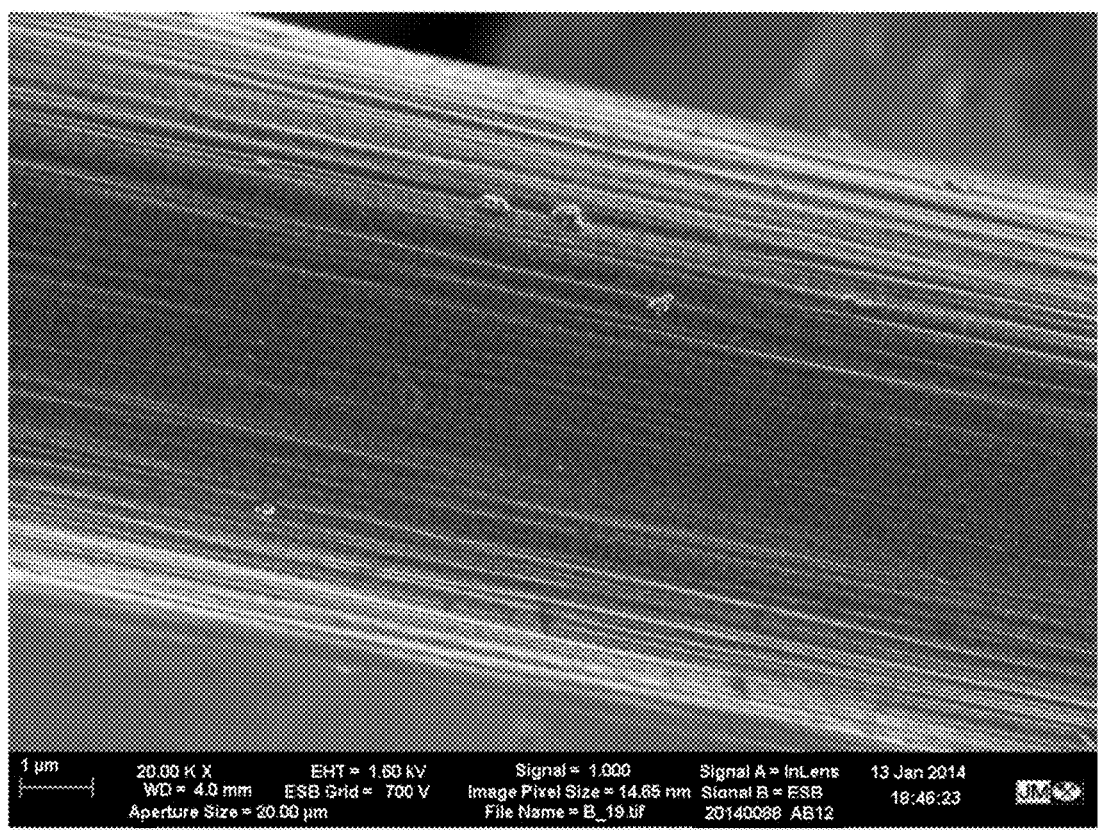
FIG. 3 is a SEM image of a comparative Example.

Scanning electron micrograph (SEM) images of Example 1 and Comparative Example 2 are provided in FIGS. 2 and 3 respectively. It can clearly be seen in FIG. 2 that there is a roughness on the fibres caused by the presence of the inert particles in the coating on the fibres. No such roughness can be seen in FIG. 3.

Electrochemical Corrosion Test

A standard electrochemical test utilising a three electrode configuration with a Pd/C+mercury sulphate reference electrode, a Pt gauze counter electrode and a sample of the gas diffusion substrate (either Example 1 or Comparative Example 1 or 2) held by a pure Au wire as the working electrode. An electrolyte of 1M $H_2SO_{4(aq)}$ at 80° C. is employed to mimic the temperature and pH of an operational PEMFC. A typical test method is the application of a high potential (up to 1.4V, typically 1.2V) and measurement of the current density produced as a function of time; highly corrodible materials yield a high corrosion current.

Figure 4:
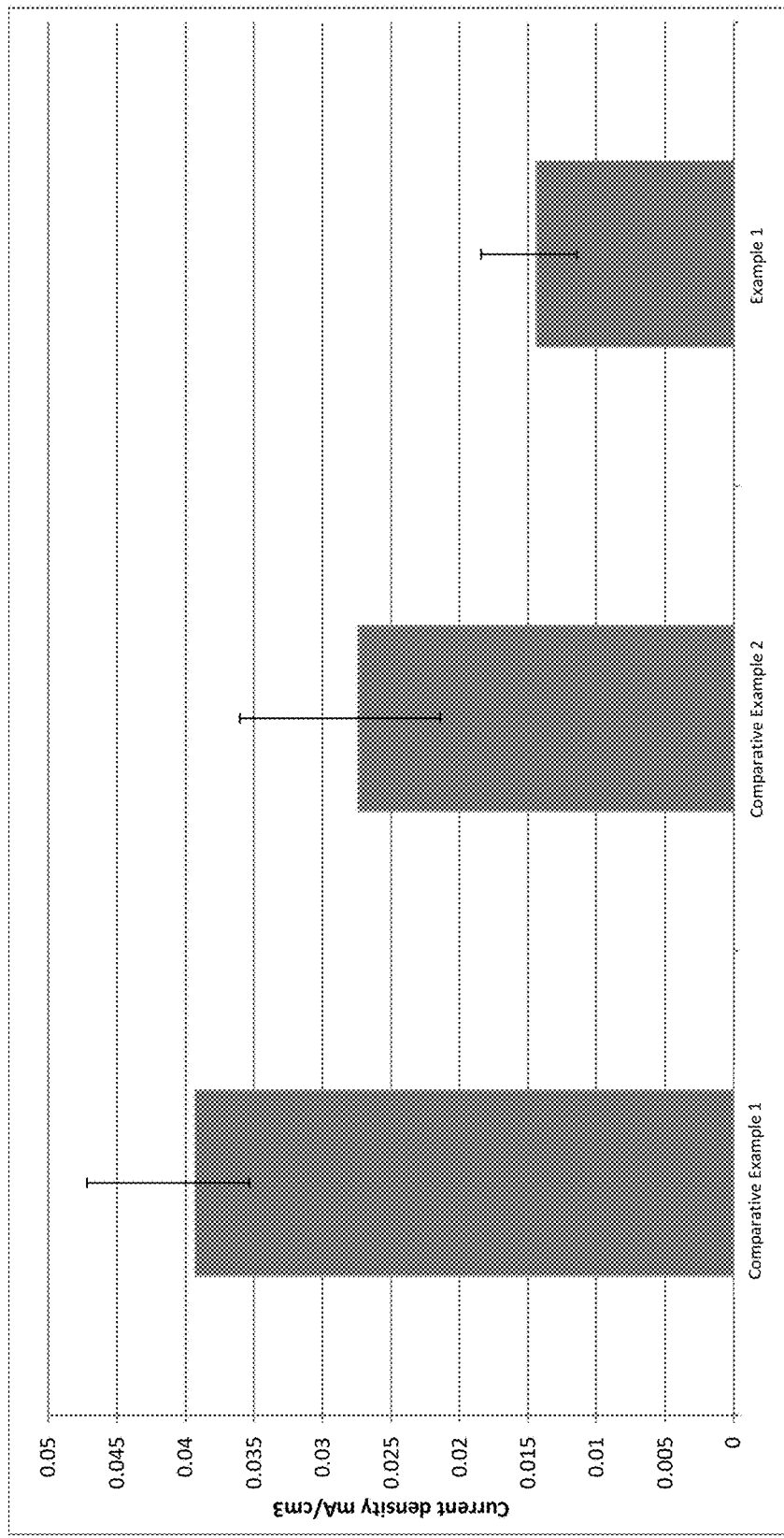
FIG. 4 is a graph showing the corrosion current density of an Example of the invention and two Comparative Examples.

FIG. 4 shows the current density obtained for each of Example 1, Comparative Example 1 and Comparative Example 2. It can be seen that the corrosion current density for the substrate of the invention (Example 1) is almost half that of Comparative Example 2 and almost a third that of Comparative Example 1. This demonstrates that the substrate of the invention has unexpectedly improved corrosion properties over Comparative Examples 1 and 2.

Wettability Test

The ethanol contact angle of each of Example 1 and Comparative Examples 1 and 2 is determined using the method disclosed in WO2004/066417.

Samples of the gas diffusion substrate of Example 1, Comparative Example 1 or Comparative Example 2 are dipped in isopropylalcohol (IPA) or ethanol so that at least an edge of the sample is in complete contact with the liquid. The change in mass of the sample is recorded over time, as the sample absorbs the liquid by capillary action.

A graph of weight gain vs. square root of elapsed time is plotted and the gradient of the curve during the linear portion of the graph obtained. The ratio of the gradient for ethanol to the gradient for IPA is then calculated. This ratio is then corrected for the difference in liquid properties by multiplying by the ratio of the product of liquid density and the square root of the liquid surface tension and then dividing by the ratio of the fluid viscosities. The result of this calculation is the ratio of the square roots of the cosines of the contact angles. It is assumed that IPA is completely wetting and thus the cosine of the contact angle is 1, so taking the inverse cosine of the square of the result of the calculation gives the contact angle of ethanol.

FIG. 5 shows the ethanol contact angle for each of Example 1, Comparative Example 1 and Comparative Example 2 in both a machine direction (MD) and cross direction (CD) of the non-woven fibre web. The ethanol contact angle of the Example 1 is greater than that of either comparative examples, indicating that the substrate of the invention is more hydrophobic and will therefore have different water management properties over the comparative examples.

The invention claimed is:

1. A porous gas diffusion substrate comprising:
   (a) a porous non-woven web comprising individual carbon fibres; and
   (b) a carbonaceous residue; wherein the carbonaceous residue is embedded within the porous non-woven web;
   (c) a fluorinated polymer; and
   (d) inert particles wherein the inert particles comprise particulate graphite, particulate carbon, carbon black, metal oxide, refractory oxide, or metal carbide;
   wherein the fluorinated polymer is present at a concentration of 1-20 weight % with respect to the weight of the porous gas diffusion substrate without the coating;
   wherein at least some of the carbon fibres of the porous non-woven web have a coating on the individual fibers comprising the fluorinated polymer and inert particles; and
   wherein the inert particles of the coating are present at a concentration of 0.1-10 weight % of the weight of the fluorinated polymer.

2. The porous gas diffusion substrate according to claim 1, wherein the fluorinated polymer is selected from the group consisting of: fluorinated ethylene propylene (FEP); polyvinylfluoride (PVF), polyvinylidene fluoride (PVDF)

polytetrafluoroethylene (PTFE); polychlorotrifluoroethylene (PCTFE); perfluoroalkoxy polymer (PFA); polyethylenetetrafluoroethylene (ETFE); polyethylenechlorotrifluoroethylene (ECTFE); perfluorinated elastomer [perfluoroelastomer] (FFPM/FFKM); fluorocarbon [chlorotrifluoroethylenevinylidene fluoride] (FPM/FKM); perfluoropolyether (PFPE); perfluorosulphonic acid (PFSA); and perfluoropolyoxetane.

3. The porous gas diffusion substrate according to claim 1, wherein the inert particles are particulate graphite or particulate carbon.

4. The porous gas diffusion substrate according to claim 1, wherein the inert particles have a largest dimension of from 0.1 to 20 microns.

5. The porous gas diffusion substrate according to claim 1, wherein at least 50% of the carbon fibres have a coating comprising the fluorinated polymer and inert particles.

6. The porous gas diffusion substrate according to claim 1, wherein the coating on the carbon fibres is complete.

7. The porous gas diffusion substrate according to claim 1, wherein the coating on the carbon fibres is incomplete.

8. The porous gas diffusion substrate according to claim 1, wherein the gas diffusion substrate further comprises electrically conductive carbonaceous particles embedded within the porous non-woven web.

9. A process for the manufacture of the porous gas diffusion substrate according to claim 1, the process comprising the steps:
(i) providing a porous non-woven web comprising carbon fibres;
(ii) providing a dispersion comprising a carbonisable resin;
(iii) impregnating the porous non-woven web with the dispersion prepared in step (ii);
(iv) carrying out a curing step to cure the carbonisable resin at a temperature of from 100° C. to 300° C.;
(v) carrying out a heat treatment step to carbonise/graphitise the carbonisable resin at a temperature of from 900° C. to 3000° C. to provide a gas diffusion substrate precursor;
(vi) providing a dispersion comprising water, fluorinated polymer and inert particles;
(vii) treating the gas diffusion substrate precursor with the dispersion prepared in step (vi);
(viii) drying; and
(ix) heating at a temperature of up to 400° C. to provide the gas diffusion substrate.

10. A gas diffusion layer comprising a porous gas diffusion substrate as claimed in claim 1 and a microporous layer applied to one face of the porous gas diffusion substrate.

11. A gas diffusion electrode comprising a gas diffusion substrate as claimed in claim 1 and an electrocatalyst layer present on one face of the porous gas diffusion substrate.

12. A gas diffusion electrode comprising a gas diffusion layer as claimed in claim 10 and an electrocatalyst layer present on the face of the gas diffusion layer having the microporous layer.

13. A membrane electrode assembly comprising a porous gas diffusion substrate as claimed in claim 1, a polymer electrolyte membrane and an electrocatalyst layer between the porous gas diffusion substrate and the polymer electrolyte membrane.

* * * * *